US012651501B2

(12) United States Patent
Alrumaih et al.

(10) Patent No.: US 12,651,501 B2
(45) Date of Patent: Jun. 9, 2026

(54) PHYSICAL SECURITY DEVICE AND METHOD TO RECORD CHANGES IN THE PHYSICAL SECURITY DEVICE

(71) Applicant: SAUDI ARABIAN OIL COMPANY, Dhahran (SA)

(72) Inventors: Abdullah Alrumaih, Al Khobar (SA); Mashail Almohumeed, Al Khobar (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 58 days.

(21) Appl. No.: 18/581,891

(22) Filed: Feb. 20, 2024

(65) Prior Publication Data

US 2025/0265884 A1 Aug. 21, 2025

(51) Int. Cl.
G07C 9/29 (2020.01)
G06K 7/10 (2006.01)

(52) U.S. Cl.
CPC ........... G07C 9/29 (2020.01); G06K 7/10366 (2013.01)

(58) Field of Classification Search
CPC ........... G07C 9/29; G07C 2009/00785; G06K 7/10366; E05B 49/004; E05B 2045/065; E05B 49/006; H04W 4/021
See application file for complete search history.

(56) References Cited

U.S. PATENT DOCUMENTS 3,943,309 A * 3/1976 Kawamoto ......... E05B 27/0053
70/337
6,097,306 A 8/2000 Leon et al.

2012/0324968 A1 12/2012 Goren et al.
2014/0028443 A1 1/2014 Ebner
2020/0011092 A1 1/2020 Lowe et al.
2023/0163399 A1 * 5/2023 Lu ............................. H02J 9/06
2023/0219728 A1 * 7/2023 Palumbo, Jr. ........ B65D 55/145
220/210

FOREIGN PATENT DOCUMENTS

CN 212391825 U 1/2021
CN 212694684 U 3/2021
CN 216927684 U 7/2022

* cited by examiner

*Primary Examiner* — Vernal U Brown

(74) *Attorney, Agent, or Firm* — Osha Bergman Watanabe & Burton LLP

(57) ABSTRACT

A security device, a security system, and a process, including a mechanical lock, a radio-frequency identification (RFID) reader, an electrical power supply, a switch, a non-transitory computer memory, a data-port, and a microprocessor are described. The RFID reader, the electrical power supply, the switch, the non-transitory computer memory, the microprocessor, and the data-port are fixedly attached to the mechanical lock. The radio-frequency identification (RFID) reader is configured, when supplied with electrical power, to read information from a RFID tag. The switch is configured to temporarily electrically connect the RFID tag reader to the electrical power supply. The microprocessor, powered by the electrical power supply, is configured to store the information read from the RFID and a lock-state of the mechanical lock in the non-transitory computer memory as a history log. The data-port connected to the microprocessor, is configured to copy the history log.

18 Claims, 8 Drawing Sheets

FIG. 1B                    FIG. 1C

S401 — Device locked

S402 — Key inserted and turned to unlock device

S403 — Device scans for tag for 20 seconds

S404 — Tag found ?

Yes

No

S405 — Illuminating green LED for 20 seconds

S407 — Flashing red LED for 20 seconds

S406 — Create log entry containing timestamp and tag ID information, along with unlocked status S408 — Create log entry containing timestamp, along with unlocked status Device shutdown — S409

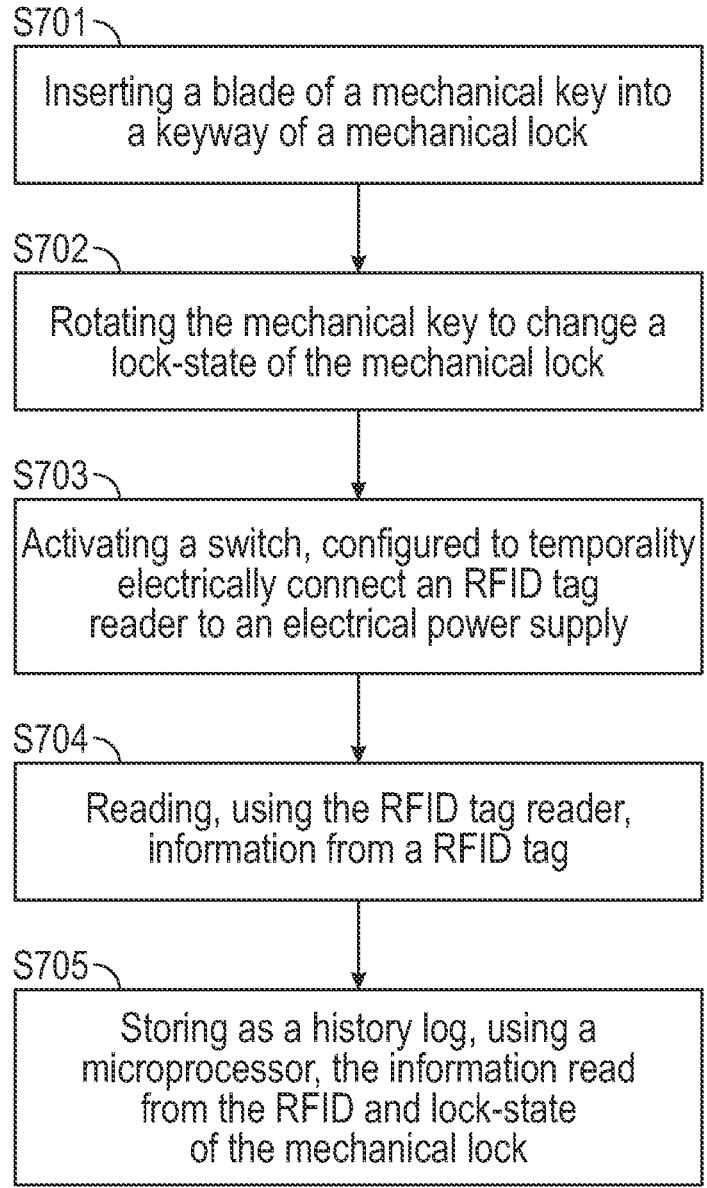

S701

Inserting a blade of a mechanical key into
a keyway of a mechanical lock

S702

Rotating the mechanical key to change a
lock-state of the mechanical lock

S703

Activating a switch, configured to temporality
electrically connect an RFID tag
reader to an electrical power supply

S704

Reading, using the RFID tag reader,
information from a RFID tag

S705

Storing as a history log, using a
microprocessor, the information read
from the RFID and lock-state
of the mechanical lock

FIG. 7

PHYSICAL SECURITY DEVICE AND METHOD TO RECORD CHANGES IN THE PHYSICAL SECURITY DEVICE

BACKGROUND

Physical security devices are used to secure a variety of objects. In some scenarios it may be important to register and record the state changes of the physical security device, for example as a history log of such state changes that may be reviewed for inspection, auditing, and investigation of unauthorized state changes.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a security device. This security device includes a mechanical lock, a radio-frequency identification (RFID) reader, an electrical power supply, a switch, a non-transitory computer memory, a data-port, and a microprocessor. The RFID reader, the electrical power supply, the switch, the non-transitory computer memory, the microprocessor, and the data-port are fixedly attached to the mechanical lock. The radio-frequency identification (RFID) reader is configured, when supplied with electrical power, to read information from a RFID tag. The switch is configured to temporarily electrically connect the RFID tag reader to the electrical power supply. The microprocessor, powered by the electrical power supply, is configured to store the information read from the RFID and a lock-state of the mechanical lock in the non-transitory computer memory as a history log. The data-port connected to the microprocessor, is configured to copy the history log.

In another aspect, embodiments disclosed herein relate to a security system. The security system includes above-mentioned security device, an associated key, and a RFID tag. The RFID tag is configured to change a lock-state of the mechanical lock of the security device. The RFID tag is configured, when read information by the RFID reader of the security device, to communicate identifying information to the RFID reader.

In yet another aspect, embodiments disclosed herein relate to a process. The process includes inserting a blade of a mechanical key into a keyway of a mechanical lock and rotating the mechanical key, where rotating the mechanical key changes a lock-state of the mechanical lock, activates a switch, configured to temporarily electrically connect an RFID tag reader to an electrical power supply and read, using the RFID tag reader, information from a RFID tag. The process further includes storing as a history log, using a microprocessor, powered by the electrical power supply, the information read from the RFID and the lock-state of the mechanical lock in a non-transitory computer memory.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

FIG. 1B shows a schematic diagram of electrical connection relationship of some elements in the physical security device in accordance with one or more embodiments.

FIG. 1C shows a schematic diagram of electrical connection between some elements of the physical security device in accordance with other embodiments.

FIG. 7 shows a flowchart of a process to forming history log in accordance with one or more embodiments.

DETAILED DESCRIPTION

Figure 1A:
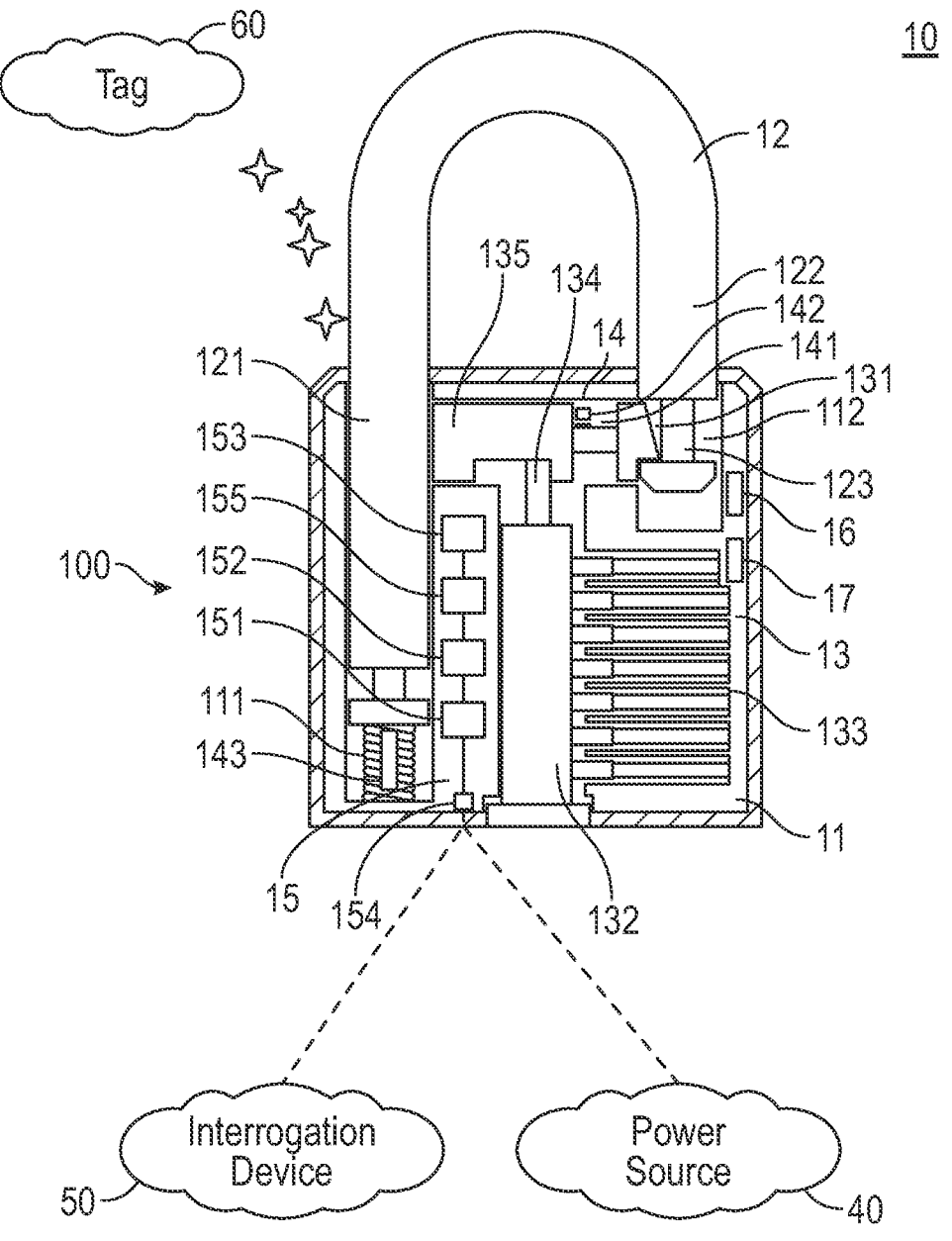
FIG. 1A shows a schematic diagram of a physical security device in accordance with one or more embodiments.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In the following description of FIGS. 1-6, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described with regard to a corresponding like-named component in any other figure.

It is to be understood that the singular forms "a," "an," and "the" include plural referents unless the context clearly dictates otherwise. Thus, for example, reference to "a tag" includes reference to one or more of such tags.

Terms such as "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is to be understood that one or more of the steps shown in the flowcharts may be omitted, repeated, and/or performed in a different order than the order shown. Accordingly, the scope disclosed herein should not be considered limited to the specific arrangement of steps shown in the flowcharts.

Although multiple dependent claims are not introduced, it would be apparent to one of ordinary skill that the subject matter of the dependent claims of one or more embodiments may be combined with other dependent claims.

In accordance with one or more embodiments, a physical security device and a security system are disclosed together with methods of operation. The physical security device may include a mechanical lock, together with an ID tag reader, such as radio-frequency ID ("RFID") tag reader, activated by way of a switch, such as an electrical switch, when the mechanical lock is locked or unlocked. The time of locking or unlocking, together with information, such as a tag identification number and the lock state (locked/unlocked), from an RFID tag located proximal to the physical security device, may be written to a history log stored within the physical security device for later retrieval, inspection, and use in compliance and auditing procedures. For example, the physical security device may be disposed on a shipping container and the RFID tag may be located at an authorized loading or unloading dock. In another example, the lock may be disposed on a filing cabinet and the RFID tag may be in the possession of an individual authorized to access information within the filing cabinet. Additionally, upon reading the tag identification, an indicator light emitted by a light-emitting element may be activated. Thus, the physical security device creates a mechanism to track the access/usage of physical data or items and the related time periods for administrative compliance and audit, along with other purposes.

FIG. 1A shows a schematic diagram of an example physical security device in accordance with one or more embodiments, specifically a padlock. The padlock shown in FIG. 1 is provided as an example and is not intended to limit the scope of physical security devices or mechanical locks claimed. In other embodiments, the physical security device may include, without limitation, a door lock, a vault lock, a safety deposit box lock, a safe lock, or a vehicle lock. As shown in FIG. 1A, the physical security device 10 includes a lock body 11; a shackle 12, and a locking system 13. The lock body 11, the shackle 12, and the locking system 13 constitute a mechanical lock 100. The lock body 11 may be fabricated from metallic materials, plastic materials, other materials, or a combination thereof. The lock body 11 has a socket 112 with which the shackle 12 is movably inserted into the socket 112. A first end 121 of the shackle 12 is located inside the lock body 11 and is attached to an elastic member 111 (e.g., a spring). A second end 122 of the shackle 12 has a tooth 123. The locking system 13 may include a moveable locking bar 131, a keyway 132, and spring-pin assembly 133. The locking system 13 is used to lock and unlock the physical security device 10 in cooperation with the shackle 12 and an associated key 20 (see FIG. 2) configured to lock and unlock the physical security device. The term "associated key" is used herein to indicate a key configured to lock and/or unlock a mechanical lock with which it is associated. An associated key is distinguished from a generic key by its configuration matching it to a specific lock with which it is match and allowing it to open and close, or lock and unlock the matching lock.

In the embodiment shown, the physical security device 10 further includes a switch 14, a chamber 15, and a light-emitting element 16. The switch 14 may be used to detect a state change of the security device from a locked state to an unlocked state or vice versa. The switch 14 may be constructed from any suitable sensor without limiting the scope of the invention. In one embodiment, the switch 14 includes a magnet 141 which is attached to the moveable locking bar 131, and a Hall sensor 142 which is based on hall effect. The Hall sensor 142 maybe a switch type Hall sensor. The Hall sensor type switch may consist of a voltage regulator, a hall element, a differential amplifier, a Schmidt trigger, and output stage. The switch type Hall sensor may output a binary digital quantity represented by low level voltage or high level voltage.

When the security device is locked or unlocked, the moveable locking bar 131 may move or rotate. The moving or rotating of the moveable locking bar 131 may cause a spatial displacement of the magnet 141 and a change in the magnetic flux density detected by a Hall sensor 142. Further the signal detected by the Hall sensor 142 may cause the switch to toggle to an activated state. In some embodiments, the activated state may persist for a limited amount of time after the motion or rotation. In one embodiment, the magnet may be disposed on the blade of a key 20 and the Hall sensor 142 may be disposed on the inside wall of the keyway 132. When the key 20 is correctly inserted into the keyway 132, the magnetic flux density received by Hall sensor 142 from the magnet 141 may momentarily toggle the Hall sensor 142. In another embodiment, the magnet may be disposed on the tooth 123 of the shackle and the Hall sensor 142 may be disposed on the on the inside wall of the socket 112.

In some embodiments, there may be two or more Hall sensors 142. When the moveable locking bar 131, the tooth 123 or the key is moved, the magnet 141 may be successively sensed by these Hall sensors 142. The temporal order in which magnets are sensed by these Hall sensors 142 can be used to determine the direction of magnet movement. The state change of the physical security device 10, such as from an unlocked status to a locked status, or vice versa, may be determined based on the order. The Hall sensor 142, when toggled, may transmit a signal (such as a voltage) to a computing element 152.

According to one or more embodiments, the switch 14 may include a regular microswitch 143 which is placed above, below, or within elastic member 111. The regular microswitch may be a pressure sensor or a trigger switch. The pressure sensor is a sensor used to measure pressure, which can convert pressure into an electrical signal output. When the physical security device 10 is locked or unlocked, the pressure sensed by the pressure sensor is changed such that a state change of the security device from a locked state to an unlocked state or vice versa can be detected. A trigger switch is a type of switch that is typically designed to be actuated by a trigger-like mechanism or similar component. The trigger switch may include a trigger or trigger-like mechanism, and a spring mechanism. The trigger is used to actuate the trigger switch. The spring mechanism returns the trigger to its original position when released. When the physical security device 10 is locked, the trigger is actuated, the spring mechanism is pressured, and a signal can be transmitted to the computing element 152. When the physical security device 10 is unlocked, the spring mechanism returns the trigger to its original position, and another signal can be transmitted to the computing element 152. Thus, the state change of the security device from a locked state to an unlocked state or vice versa can be detected.

In another embodiment, the shackle edge below the tooth 123 could have a hall effect sensor 142. The selection of switch 14 was made to identify the specific event related to the change of state, in order to eliminate false positives, or to simplify establishing proof of action (in legal disputes). The pressure sensor, the trigger switch, and one or more hall effect sensor as described above can be used together.

The computing element 152, as well as an internal power source 151, a tag reader 153, and an external port 154, may be located within the chamber 15. The computing element 152 may include a microprocessor, a memory, and a real-time clock as detailed described below. The real-time clock can be used to provide the information, specifically the current time, to create a time stamp. The storage may store software instructions that may be executed by the microprocessor. Further, a history log including entries created by the microprocessor may be stored in the memory. The entries may include, without limitation, a time stamp, the initial and final lock state of the mechanical lock, the RFID tag ID number, the designated spatial or geographical location of the tag, and an event log that includes a power status (records time/date when powered on, and on event where power is reaching a low threshold). In one or more embodiments, the entries may also include the GPS location at the time of each lock/unlock action. The GPS location may be obtained by the GNSS module 155. GNSS (Global Navigation Satellite System) refers to a constellation of satellites providing signals from space that transmit positioning and timing data to GNSS receivers. The receivers then use this data to determine location. The GNSS module 155 may include such a receiver. In one embodiment, the GNSS module 155 includes an antenna and a processing unit. The antenna can receive signals from the satellites, while the processor unit makes sense of the information being received and turns it into measurements, such as latitude and longitude.

The switch 14, when toggled, may transmit information (such as a low-level voltage from the Hall sensor 142) regarding the state changes between the locked state and the unlocked state of the security device to the computing element 152. The computing element 152 may create a history log according to the signals from the switch 14 and save the history log into the memory.

At any time, the history log stored in the memory can be copied to an interrogation device 50 via the external port 154. The interrogation device 50 may include a computer, an iPad, a lap top and the like. The interrogation device 50 may connect to the external port 154 and receive information over, through a wired or wireless communication channel (not shown). For example, the interrogation device may communicate with the external port via a Bluetooth protocol channel, i.e., the interrogation device and/or the external port may include a Bluetooth transceiver.

The computing element 152 may be powered by the internal power source 151. The internal power source 151 may be a replaceable and/or rechargeable battery. In embodiments using a rechargeable battery the rechargeable battery may be charged via the external port 154. In one embodiment, the external port 154 can be used for charging or history log download, in a manner analogous to a mobile phone's data port. In one embodiment, the external port 154 may be configured to provide wired communication, for example, through an Ethernet connection, USB cable, or other suitable connection. In another embodiment, the external port 154 may be configured to provide wireless communication utilizing one or more of WiFi (802.11), ZigBee (802.15), radio-frequency (RF) communication, infrared (IR) transmission, near field communication (NFC), Bluetooth, or any other suitable wireless data protocol.

The tag reader 153, under the control of the computing element 152, can be used to scan for a NFC tag 60 fixed at a fixed location or placed permanently in a service location. The NFC tag 60 may be a radio-frequency identification (RFID) tag, and the tag reader 153 may be an RFID reader. The NFC tag may contain a microchip and an antenna, and may store and transmit data wirelessly.

The tag reader 153 may include a RFID antenna, a RFID interface module, and a microprocessor. The RFID antenna is used to convert an electrical current signal in the tag reader into a radio-frequency ("RF") carrier signal and transmit the signal to the NFC tag 60, or receive RF carrier signals sent by the NFC tag 60 and convert them into an electrical current signal. The antenna may, without limitation, be configured as a coil antenna, a dipole antenna, or a slot antenna. For example, the antenna may be a dipole antenna, which consists of two straight wires of equal thickness and length. The two straight wires may be spaced at a certain distance, with one straight wire located on the extension line of the other straight wire. This dipole antenna may be fed between two opposite endpoints of these two straight wires. The antenna used by the NFC tag 60 may be of the same type as that used by the tag reader 153. The RFID interface module may include a modulation circuit which modulates a signal to be sent before sending it, and a demodulation circuit which amplifies and demodulates a signal transmitted by the NFC tag 60 to ensure signal reception. Modulation and demodulation can be achieved by parallel connecting a resistor or a capacitor. The microprocessor can complete signal encoding and decoding, and data encryption and decryption. The tag reader and the operation of the tag reader can be achieved by any method known to the art now or in the future.

The tag reader 153 may include an active reader and/or a passive reader. When the NFC tag is a passive RFID tag, this NFC tag 60 may be powered by signals transmitted from the tag reader 153. The NFC tag 60 may be an active RFID tag which has its own power supply (e.g., a battery). Therefore, the tag reader 153 as described herein may represent multiple readers, such as any number or combination of passive and/or active readers.

When the NFC tag 60 is passive tag, the RFID reader 153 may emit a low-power radio wave field which is used to power the passive tag so that the passive NFC tag 60 can transmit radio-frequency signals upon receiving interrogation signals from the RFID reader 153.

According to one embodiment, the light-emitting element 16 may include one or more first light-emitting diodes (LEDs) that emit light having a first color code (such as green) and one or more second LEDs that emit light having a second color code (such as red). The second color code may be different from the first color code. The different color of the LEDs may help to identify the situations, such as tag read, tag not read, or low power. This helps establish a clear, communicable method of verifying success vs failure of tag reading and recording. This can be used in a scenario that a technician has to lock a warehouse, and wondering whether the lock recorded the fact that it was closed in the spot where it could read the tag (vs the log stating that the lock was engaged at time xx/xx/xxxx xx:xx but at an unknown location).

In one embodiment, the physical security device 10 can be used on the back of a trailer, and it is expected that the lock would be unlocked at a designated unloading dock. In another embodiment, the NFC tag should be placed on a predetermined person, such as the owner of the key 20. In another embodiment, this can be expanded to include tag-pairing where the log would record the person tag along with a location tag.

FIG. 1B shows a schematic diagram of the electrical connection between some elements in the physical security device in accordance with some embodiments. As shown in FIG. 1B, in one embodiment, the switch 14, when toggled, will send a signal to the computing element 152 which in turn controls to make the internal power source 151 provide power to the tag reader 153 and/or the light-emitting element 16. After that, the computing element 152 creates a history log entry. The computing element 152 may control electric connection (such as a diode switching circuit) between the internal power source 151 and the tag reader 153 and/or the light-emitting element 16 to make the internal power source 151 provide power to the RFID tag reader 153 and/or the light-emitting element 16. Further, information read from the RFID tag by the RFID reader 153 may be communicated back to the computing element 152 (as indicated by the dashed line).

FIG. 1C shows a schematic diagram of electrical connection between some elements of the physical security device in accordance with other embodiments. In FIG. 1C the power source 151, that may be an electrical power source such as a battery, may be separated from the computing element 152 by a switch 14. When the switch 14, that may contain a Hall sensor, is activated by a changing magnetic field, power may be supplied to the computing element 152 for a duration of time, and further power, together with an activation instruction, may be provided from the computing element 152 to the RFID reader 153 and to the light-emitting element 156. Further, information read from the RFID tag by the RFID reader 153 may be communicated back to the computing element 152 (as indicated by the double-ended arrow.

Figure 2:
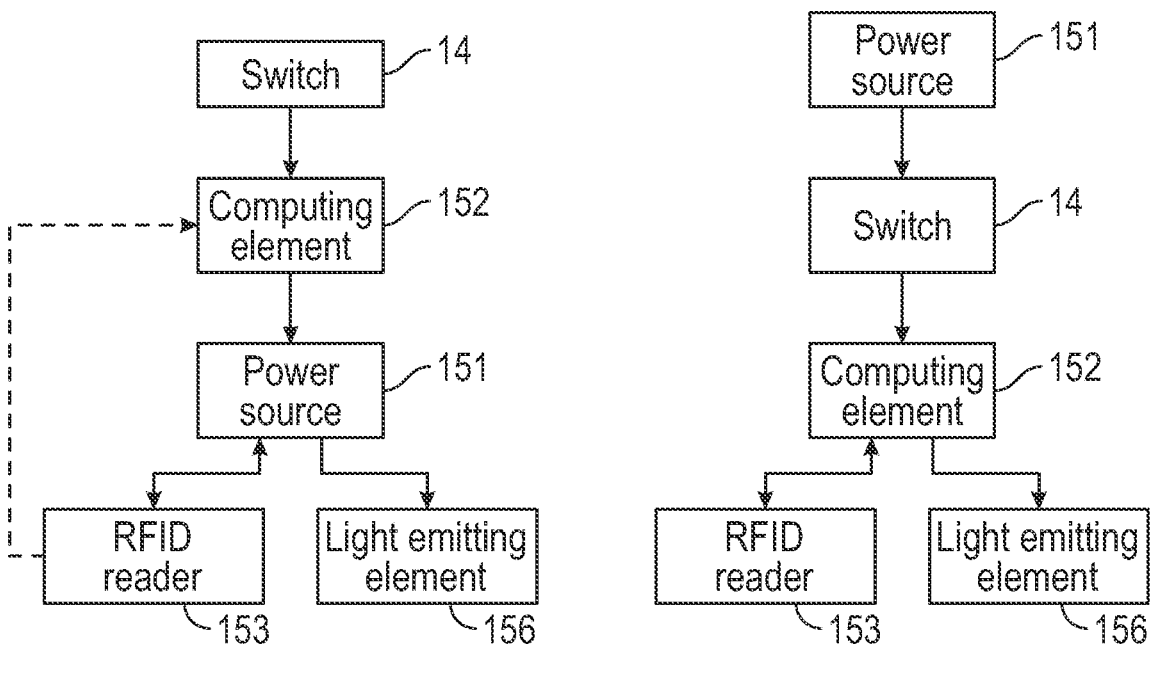
FIG. 2 shows a schematic diagram of an associated key in accordance with one or more embodiments.
Figure 2:
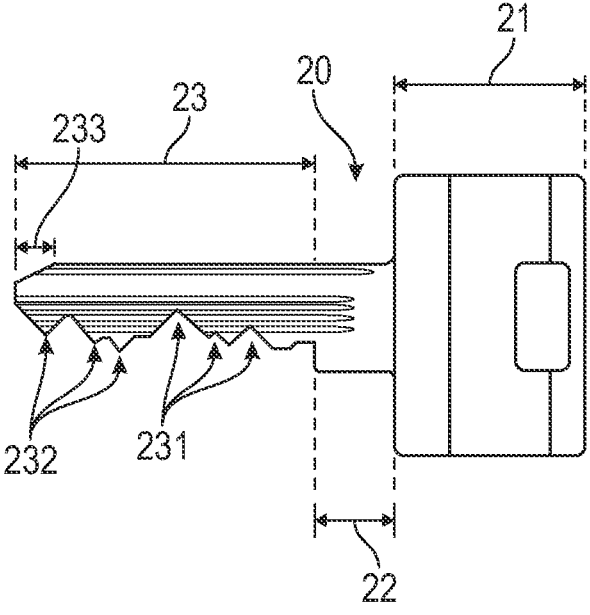

FIG. 2 shows a schematic diagram of an associated key in accordance with one or more embodiments. As shown in FIG. 2, according to one embodiment, an associated key 20 may include a head 21, a shoulder 22, and a blade 23. The head 21 of the associated key 20 may be located at a first end of the associated key and serve as a handle to turn the associated key. The shape of the head 21 can vary depending on design. The head 21 of the associated key may have a small hole which can be attached to another object (such as a key ring) to facilitate the transport and identification of the associated key. The shoulder 22 may connect the head 21 to the blade 23. The blade 23 may be located between shoulder 22 and a tip 233 at second end of the associated key. The shoulder 22 may help to regulate exactly how far the blade 23 enters into a lock. In addition, the shoulder 22 may be used to bolster the associated key's alignment during manufacturing. The tip 233 and blade 23 form the portion of the associated key that can be inserted into the keyway of the physical security device 10. The blade 23 may include one or more notches 231, one or more ridges 232, disposed between the shoulder 22 and the tip 233 located at the second end of the associated key. The tip 233 enters into the keyway first. The configuration of the notches 231 and the blades 232 of the associated key form an important role in distinguishing an associated key for a particular lock from any other generic key not associated with a particular lock. FIG. 2 is simply an illustration of one type of key. There are many other types of the key. The key shown in FIG. 1 is provided as an example and is not intended to limit the scope of the invention.

Figure 3A:
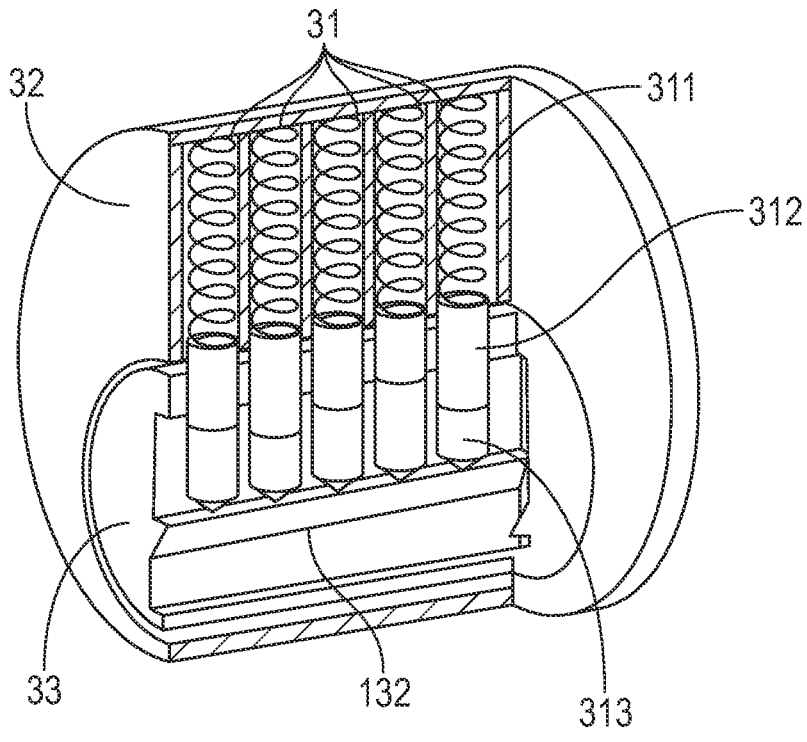
FIGS. 3A-3D show a schematic diagram of locking and unlocking the physical security device in accordance with one or more embodiments.

FIGS. 3A-3D show schematic diagrams of internal elements of a mechanical lock illustrating how the internal elements interact with a key during locking and unlocking of the physical security device. As shown in FIGS. 3A-3D, the spring-pin assembly 133 may include one or more springs units 31 (5 springs units are shown in FIG. 3A), lock cylinder 32, and lock core 33. The springs units 31 and the lock core 33 are disposed within the lock cylinder 32. Each of the spring units 31 may include a spring 311, a driver pin 312, and a key pin 313. All the driver pins 312 may have the same length or different length, while each of the key pins 313 may have differing lengths.

Figure 3B:
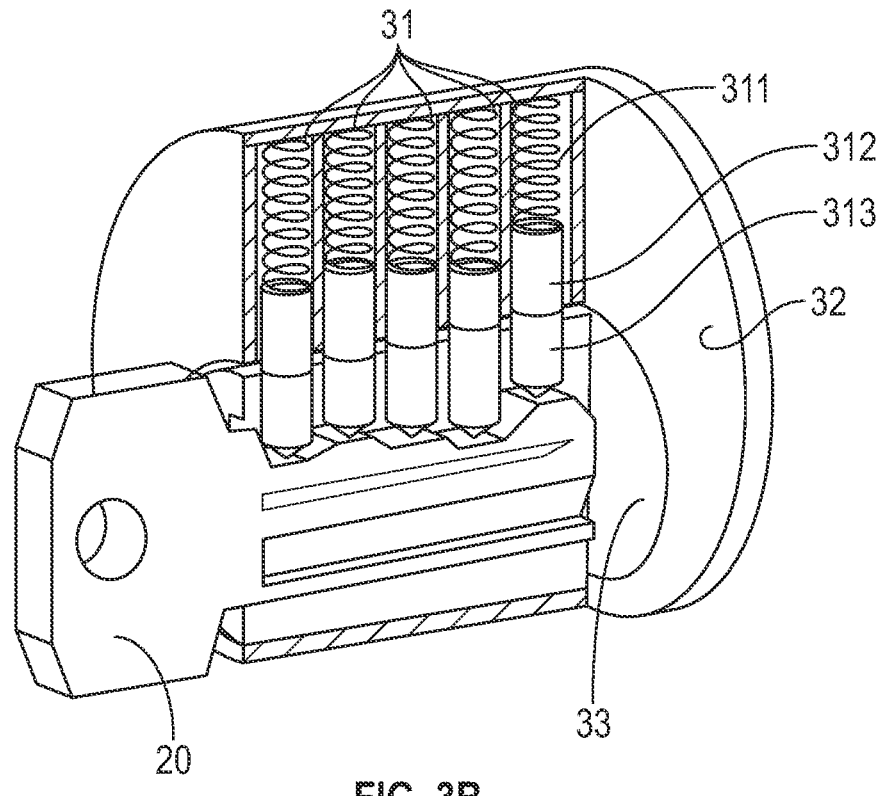
Figure 3C:
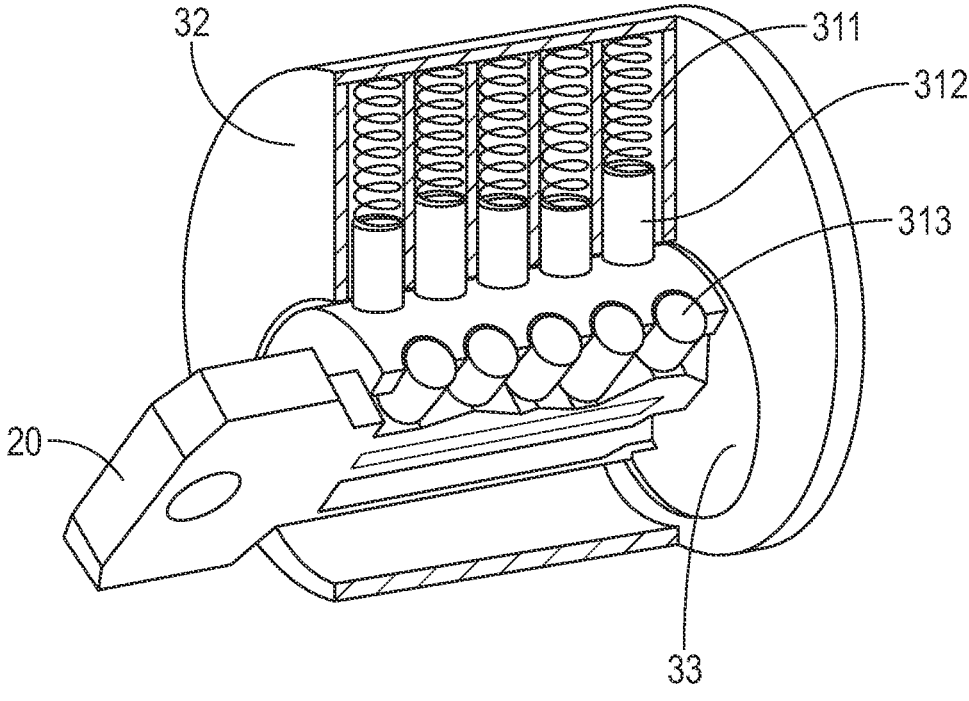
Figure 3D:
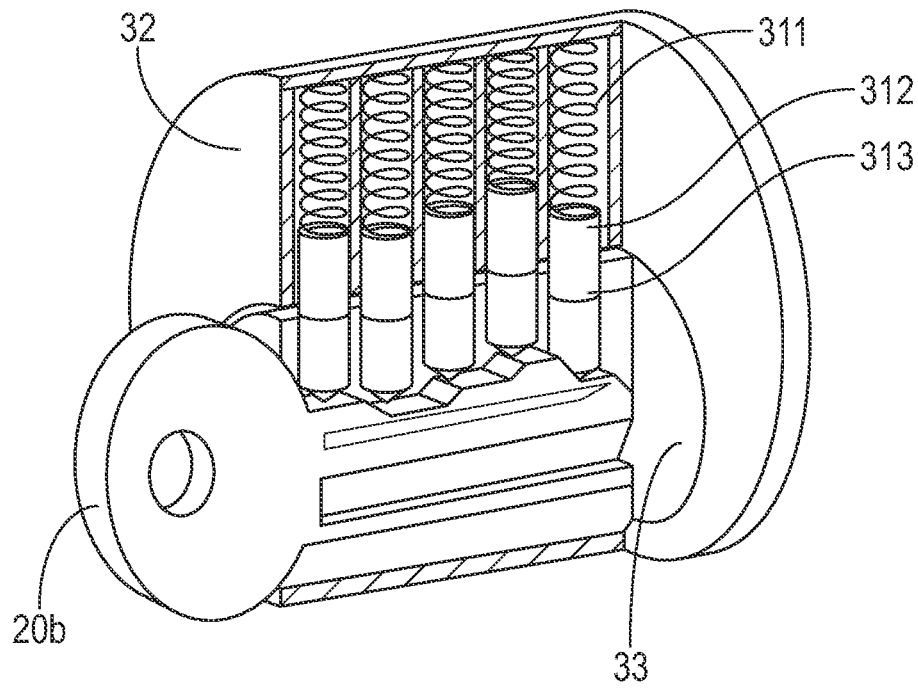

As shown in FIG. 3A, when there is no key in the keyway 132, the driver pins 312 are pushed inwards by springs 311 toward the keyway, preventing the lock core 33 from rotating. As shown in FIG. 3B, when a correct associated key 20 (a key configured to open and/or lock the lock) is inserted into the keyway, each key pin 313 is matched with a corresponding notch 231 or ridge 232, such that the gaps between the driver pins 312 and the key pins 313 align with the outer cylindrical surface of the lock core 33. Then, as shown in FIG. 3C, turning of the associated key 20 can rotate the lock core 33 freely. The rotating of the lock core 205 can cause a bar 134 (see FIG. 1) move or release the bar so it can be moved by other means, such as manually. The bar 134 may installed on or connected with lock core 205 and can move along a straight line when the lock core 205 rotates. The move of the bar 134 can cooperate with the body 135 of the moveable locking bar 131 can lead the moveable locking bar 131 move. The rotation of key 20 in different directions can lead the moveable locking bar 131 move in different directions such that the moveable locking bar 131 engages or disengages with the tooth 123 of the shackle 12. The physical security device 10 is then locked or unlocked. On the other hand, as shown in FIG. 3D, when an incorrect key 20*b* (a key not intended to lock and/or unlock the mechanical security device) is inserted into the keyway, the key pins do not match with corresponding notch 231 or ridge 232. In this scenario, the drive pins are not pushed outward by the correct amount and the drive pins 312 prevent the lock core 33 from rotating. Accordingly, the physical security device 10 would not be unlocked or locked by an incorrect key.

Figure 4:
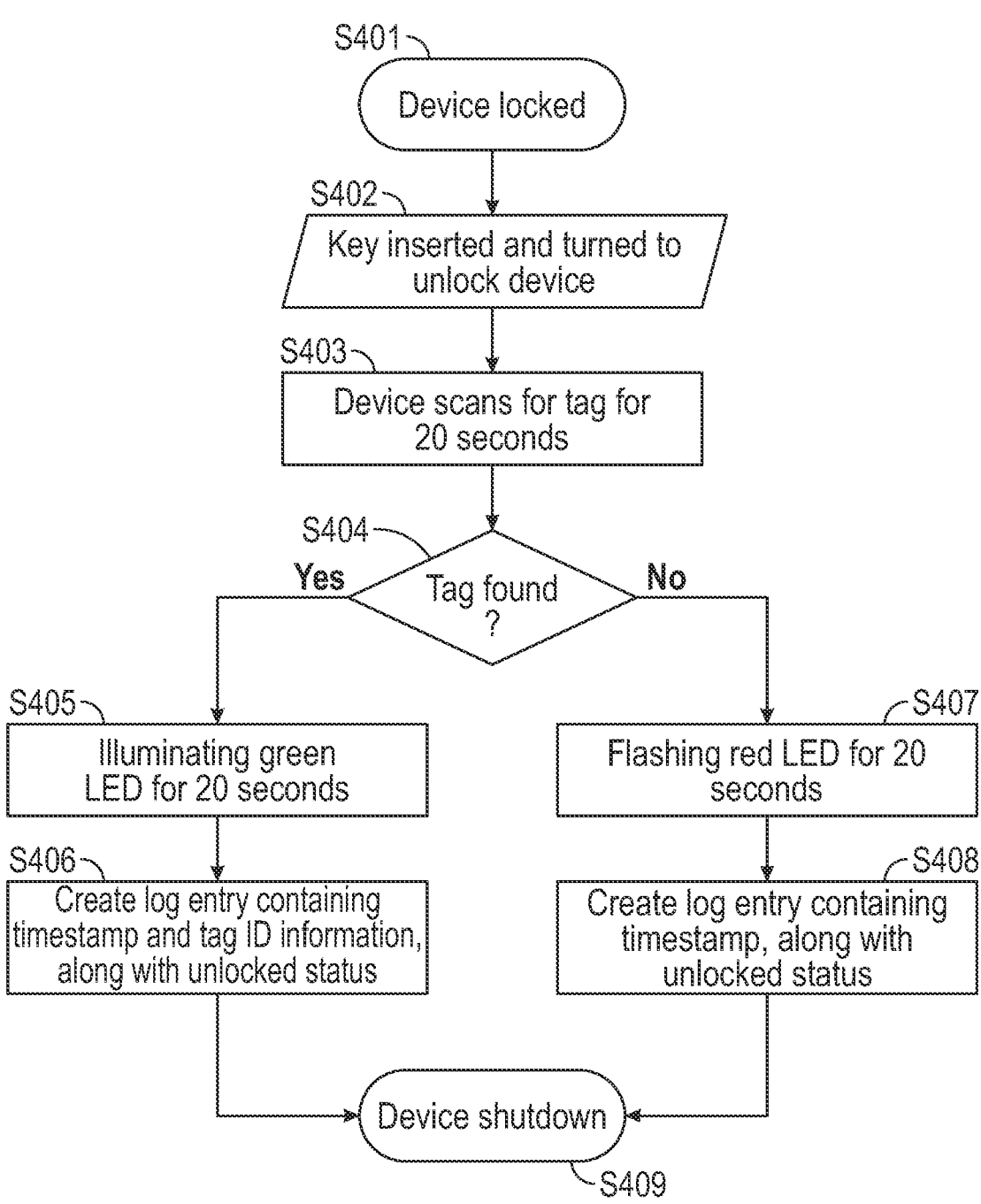
FIG. 4 shows a flowchart of an operation of the physical security device as the physical security device is being unlocked in accordance with one or more embodiments.

FIG. 4 shows a flowchart illustrating an operation of the physical security device in accordance with one or more embodiments. Specifically, in step (S401), FIG. 4 shows the physical security device commencing in a locked state and moving to an unlocked state and an entry written into a history log at step (S409). In step (S401), the physical security device is in a locked state. In step (S402), a key 20 may be inserted into the keyway 132, and turned. The turning of the key may cause the moveable locking bar 131 to move and disengage from the tooth 123 such that the shackle 12 is freed to move relative to the lock body 11. The freed shackle 12 is forced by the elastic member 111 to move a limited amount of distance out from the lock body 11, whereby the physical security device 10 is unlocked. In one embodiment, the switch 14 may activated by the moving of the moveable locking bar 131. When the moveable locking bar 131 is moved, the switch 14 is toggled and sent a signal to the computing element 152 which in turn controls the power source 151 to power the tag reader 153 and the light-emitting element 16. In other embodiments, the switch 14 may be toggled by inserting the associated key 20 or the movement of the tooth 123.

Once activated, in step (S403), the RFID reader 153, under the control of the computing element 152, may scan for a RFID tag within the vicinity of the physical security device. The RFID reader may scan for a fixed period of time, such as 20 seconds, at the end of which period the RFID reader will have either located and read or interrogated the RFID tag or determined that no RFID tag is present within the vicinity. The RFID tag may be located at fixed location or carried by an authorized operative, depending upon the use-case of the physical security device. The fixed location or service location may relate to an object (lockout devices such as doors, gates, or cabinets securing sensitive documents) to be protected by the security device. For example, the RFID tag should be fixed in a place within a predetermined distance to a predetermined object and is not movable. The coordinates of the location may be prestored in the storage of the computing element 152. In one embodiment, tag ID information of the RFID tag is prestored in the storage of the computing element 152. The coordinates or the tag ID information can be used to check the RFID tags found. The purpose of step (S403) is to find an RFID tag located within a predetermined area and whose RFID tag ID information has been prestored in the storage. In this embodiment, the physical security device can be used in a scenario that the lock is used to lock something movable.

The intention is to prove for audit/legal purposes that the lock was engaged at proximity for a described amount of time. So, the lock would record proximity at the moment it is locked, and the moment it is unlocked, and that it was not unlocked between the two events. In one or more embodiments, the lock may be configured to only change the status in the presence of a tag that matches a determined type/format.

One scenario example would be the securing a case containing confidential documents, with a tag placed inside the case, in a manner that the tag would be readable from the case lock location. If the lock was opened, that would create an event in the log, so the absence of an unlock event between legitimate usage events would lead to confidence that the lock was sufficient to secure the confidentiality.

Another scenario example would be to release a user from responsibility from someone entering an area that should be closed, such as if a person covered and locked a swimming pool cover, later children forced their way under the cover (into the pool) and were injured. The person could prove that he made clear efforts to block access to the pool, by displaying the time he locked the pool cover, and that it was not unlocked between his enforcement and the injury.

If the RFID tag is found (in step (S404, "YES")), the computing element 152 may control the first LEDs of the light-emitting element 16 to constantly emit light having the first color code for a period of time, such as 20 seconds, in step (S405). The LED color is meant to verify that tag was read. This means that an untrained user can use it, after reading a pamphlet or a "how to" booklet. In addition, in step (406) the computing element 152 creates a history log entry including a time stamp and the RFID tag ID information of the found RFID tag, along with the unlocked state. Finally, the process ends at step (S409). If the RFID tag is not found (in step (S404, "NO")), the computing element 152 may control the second LEDs of the light-emitting element 16 to flash with light having the second color code for a period of time, such as engagement, 20 seconds, in step (S407). In addition, in step (S408), the computing element 152 creates a history log entry including a time stamp, along with the unlocked state. Then the process ends at step (S409).

Figure 5:
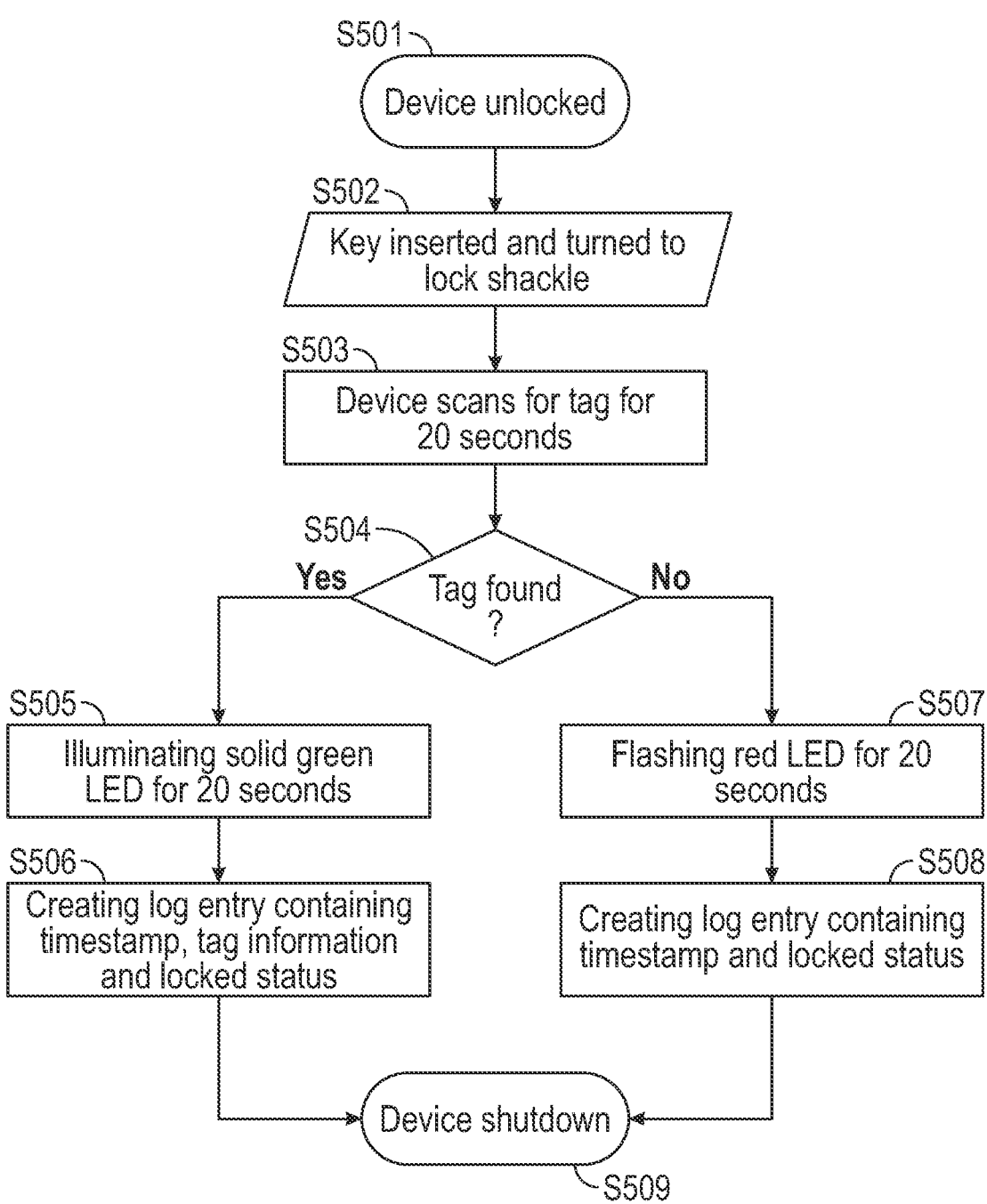
FIG. 5 shows a flowchart of an operation of the physical security device as the physical security device is being locked in accordance with one or more embodiments.

FIG. 5 shows a flowchart of an operation of the physical security device as the physical security device is being locked in accordance with one or more embodiments. Specifically, in step (S501), FIG. 5 shows the physical security device 10 in an unlocked state. In step (S502), an associated key 20 is inserted into the keyway 132, and turned. The turning of the key 20 causes moveable locking bar 131 to move and engage with the tooth 123 of the shackle 12. The physical security device 10 is then locked. In one embodiment, when the moveable locking bar 131 is moved, the switch 14 is toggled and sent a signal to the computing element 152, which in turn controls the power source 151 to power tag reader 153 and the light-emitting element 16. In other embodiments, the switch may be toggled by inserting the key, and the like.

In step (S503) the RFID tag reader 153 then scans for a RFID tag fixed at a nearby known location or placed permanently in a service location. If the tag is found (in step (S504), "YES"), the computing element 152 may, in step (S505) cause the first LEDs of the light-emitting element 16 to emit light having the first color code for a period of time, such as 20 seconds. In addition, in step (S506) the computing element 152 may create a history log entry including a time stamp and tag ID information of the found tag, along with the locked state. Then in step (S509) the process ends. If the tag is not found (in step (S504), "NO"), the computing element 152 may in step (507) cause the second LEDs of the light-emitting element 16 to flash with light having the second color code, such as red, for a period of time, such as 20 seconds. In addition, in step (S508), the computing element 152 creates a history log entry including a time stamp, along with the unlocked state. Then the process ends at step (S509).

In one or more embodiments, the electrical parts of the device (such as the tag reader, the computing element, and the light-emitting element) may be powered down or set on a standby mode when the process ends (steps (S409) and (S509)), for example, immediately after the history log entry has been created and stored or a predetermined amount of time (such as 5 seconds) thereafter. In these embodiments, the storage of the computing element 152 may be a persistent or non-transient, storage.

Additionally, some embodiments will aid in logging the state of physical access, and the challenge of tracking historical data regarding physical security will be greatly mitigated in comparison to conventional methods.

In one or more embodiments, if the power level of the power source 151 is low, a visual/auditory indicator 17 (see FIG. 1) may be triggered to alert the user for a preset amount of time. Additionally, if the battery charge is low, toggling of the switch 14 may also cause the visual/auditory indicator 17 to be triggered momentarily. The visual/auditory indicator 17 may be a speaker or a LED light. Some sensors (not shown) may be utilized to identify other conditions, for example, a low battery condition or attempts to tamper with the security device.

Figure 6:
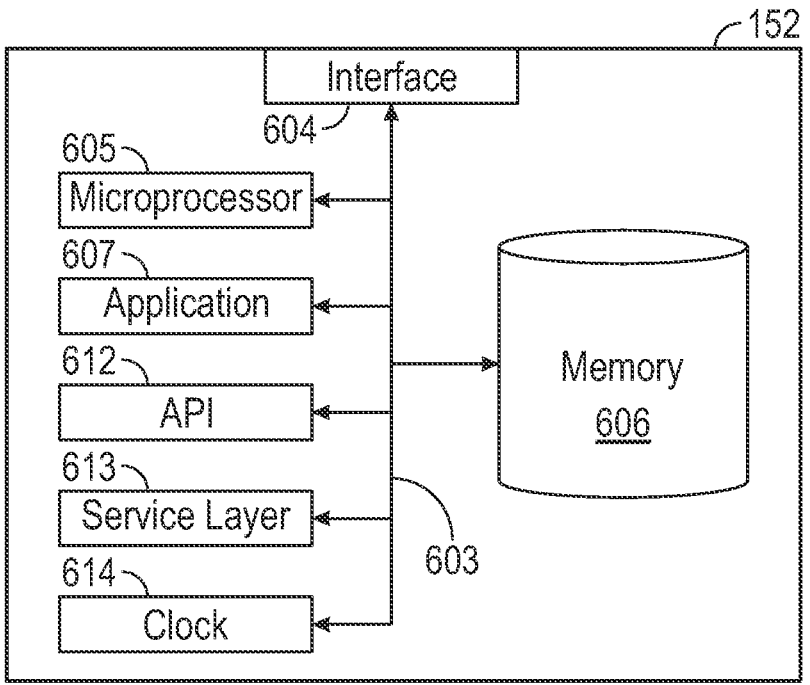
FIG. 6 shows a computing element in accordance with one or more embodiments.

FIG. 6 depicts a block diagram of a computing element 152 used to provide computational functionalities associated with described algorithms, methods, functions, processes, flows, and procedures as described in this disclosure, according to one or more embodiments. For example, the microprocessor 605 of the computing element 152, may be used to perform one or more steps of the flowchart (calculations, determinations, etc.) in FIGS. 4, 5, and 7.

The illustrated computing element 152 is intended to encompass any computing device which is suitable put into the physical security device. At a high level, the computing element 152 is an electronic computing device operable to receive, transmit, process, store, or manage data and information associated with the described embodiments.

Each of the components of the computing element 152 can communicate using a system bus 603. In some implementations, any or all of the components of the computing element 152, both hardware or software (or a combination of hardware and software), may interface with each other or the interface 604 (or a combination of both) over the system bus 603 using an application programming interface (API) 612 or a service layer 613 (or a combination of the API 612 and service layer 613). The API 612 may include specifications for routines, data structures, and object classes. The API 612 may be either computer-language independent or dependent and refer to a complete interface, a single function, or even a set of APIs. The service layer 613 provides software services to the computing element 152 or other components (whether or not illustrated) that are communicably coupled to the computing element 152. The functionality of the computing element 152 may be accessible for all service consumers using this service layer. Software services, such as those provided by the service layer 613, provide reusable, defined business functionalities through a defined interface. For example, the interface may be software written in JAVA, C++, or other suitable language providing data in extensible markup language (XML) format or another suitable format. While illustrated as an integrated component of the computing element 152, alternative implementations may illustrate the API 612 or the service layer 613 as stand-alone components in relation to other components of the computing element 152 or other components (whether or not illustrated) that are communicably coupled to the computing element 152. Moreover, any or all parts of the API 612 or the service layer 613 may be implemented as child or submodules of another software module, or hardware module without departing from the scope of this disclosure.

The computing element 152 includes an interface 604. Although illustrated as a single interface 604 in FIG. 6, two or more interfaces 604 may be used according to particular needs, desires, or particular implementations of the computing element 152. The interface 604 is used by the computing element 152 for communicating with other systems that are connected to the external port 154. Generally, the interface 604 includes logic encoded in software or hardware (or a combination of software and hardware) and operable to communicate with the external port 154. More specifically, the interface 604 may include software supporting one or more communication protocols associated with communications such that the computing element 152 can communicate with the interrogation device 50 via the external port 154 and the history log in the memory 606 could be download. The interface 604 may also be figured to receive signals from the switch 14 and power from the power source 151.

The computing element 152 includes at least one microprocessor 605. Although illustrated as a single microprocessor 605 in FIG. 6, two or more microprocessors 605 may be used according to particular needs, desires, or particular implementations of the computing element 152. Generally, the microprocessor 605 executes instructions and manipulates data to perform the operations of the computing element 152 as described in the instant disclosure.

The computing element 152 also includes a memory 606 that holds data for the computing element 152 or other components (or a combination of both) that can be connected to the external port 154. For example, memory 606 can be a database storing history log data consistent with this disclosure. Although illustrated as a single memory 606 in FIG. 6, two or more memories may be used according to particular needs, desires, or particular implementations of the computing element 152 and the described functionality. While memory 606 is illustrated as an integral component of the computing element 152, in alternative implementations, memory 606 can be external to the computing element 152.

The application 607 is an algorithmic software engine providing functionality according to particular needs, desires, or particular implementations of the computing element 152, particularly with respect to functionality described in this disclosure. For example, application 607 can serve as one or more components, modules, applications, etc. Further, although illustrated as a single application 607, the application 607 may be implemented as multiple applications 607 on the computing element 152. In addition, although illustrated as integral to the computing element 152, in alternative implementations, the application 607 can be external to the computing element 152.

The real time clock 614 may take the form of an integrated circuit to measure the passage of real-time. The real time clock 614 may be a battery backup power clocks so that it tracks the time even while the computing element 152 is in low power state.

FIG. 7 shows a flowchart of a process to form a history log in accordance with one or more embodiments. As shown in FIG. 7, according to one embodiment, at step (S701), a blade of mechanical key 20 is inserted into a keyway of a mechanical lock 100. In step (S702), the mechanical key may rotate thereby changing a lock-state of the mechanical lock. At step (S703), a switch is activated, and an RFID tag reader is temporarily electrically connected to an electrical power supply, such as a battery. At step (S704), the RFID tag reader reads information from a RFID tag which may, for example, be placed permanently in a service location. The information read from the RFID tag may be read in step (S705) and the lock-state of the mechanical lock and a time stamp, indicating the time at which the lock state is alter, i.e., locked or unlocked are stored as a history log, using a microprocessor, powered by the electrical power supply, in a non-transitory computer memory. The process may further include transmitting when interrogated, using a data-port connected to the microprocessor, the history log to an interrogation device.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed is:

1. A security device, comprising:
a mechanical lock; and
fixedly attached to the mechanical lock:
    a radio-frequency identification (RFID) reader, configured, when supplied with
    electrical power, to read information from a RFID tag,
    an electrical power supply,
    a switch configured to temporarily electrically connect the RFID tag reader to the electrical power supply,
    a non-transitory computer memory, a microprocessor, powered by the electrical power supply, configured to store the information read from the RFID tag and a lock-state of the mechanical lock in the non-transitory computer memory as a history log, and a data-port connected to the microprocessor, configured to transmit when interrogated, the history log, wherein the switch comprises a first Hall sensor disposed on an inside wall of a keyway, configured to detect a movement of a first magnet, wherein the first magnet is disposed on an associated key.

2. The security device of claim 1, further comprising a light-emitting element fixedly attached to the mechanical lock and communicably connected to the microprocessor, wherein the light-emitting element emits a first color code when the RFID reader detects the RFID tag and a second color code when the RFID reader fails to detect the RFID tag.

3. The security device of claim 2, wherein the light-emitting element emits a third color code when a low electrical power state of the electrical power supply is detected by the microprocessor.

4. The security device of claim 2, wherein the light-emitting element comprises at least one light-emitting diode.

5. The security device of claim 1, wherein fixedly attached comprises disposed within a chamber of the mechanical lock.

6. The security device of claim 1, wherein the data-port comprises a Bluetooth transceiver.

7. The security device of claim 1, wherein the microprocessor comprises a real-time clock, configured to provide a time stamp at which a change in the lock-state occurred, and further configured to record the time stamp in the history log.

8. The security device of claim 1, wherein the switch comprises:

a second magnet disposed on a moveable locking bar; and a second Hall sensor configured to detect a movement of the second magnet.

9. The security device of claim 1, wherein the mechanical lock further comprises:

a shackle and a socket in which the shackle can move, and wherein the switch includes a third magnet disposed on the shackle and a third Hall sensor disposed on an inside wall of the socket configured to detect a movement of the third magnet.

10. A security system, comprising:

a mechanical lock, comprising:

a radio-frequency identification (RFID) reader, configure to read information from a RFID tag, an electrical power supply, a switch configured to temporarily electrically connect the RFID tag reader to the electrical power supply, a non-transitory computer memory, a microprocessor, powered by the electrical power supply, configured to store the information read from the RFID tag and a lock-state of the mechanical lock in the non-transitory computer memory as a history log, and a data-port attached to the microprocessor, configured to transmit when interrogated, the history log, wherein the switch comprises a first Hall sensor disposed on an inside wall of a keyway, configured to detect a movement of a first magnet, wherein the first magnet is disposed on an associated key configured to change a lock-state of the mechanical lock; and a RFID tag configured, when read information by the RFID reader, to communicate identifying information to the RFID reader.

11. The security system of claim 10, further comprising an interrogation device, configured to read the history log from the data-port.

12. The security system of claim 10, wherein the mechanical lock further comprises a light-emitting element fixedly attached to the mechanical lock and communicably connected to the microprocessor, wherein the light-emitting element emits a first color code when the RFID reader detects the RFID tag and a second color code when the RFID reader fails to detect the RFID tag.

13. The security system of claim 12, wherein the light-emitting element comprises at least one light-emitting diode.

14. The security system of claim 10, wherein the microprocessor comprises a real-time clock, configured to provide a time stamp at which a change in the lock-state occurred, and further configured to record the time stamp in the history log.

15. The security system of claim 10, wherein the switch comprises:

a second magnet disposed on a moveable locking bar; and a second Hall sensor configured to detect a movement of the second magnet.

16. The security system of claim 10, wherein the mechanical lock further comprises:

a shackle and a socket in which the shackle can move, and wherein the switch includes a third magnet disposed on the shackle and a third Hall sensor disposed on an inside wall of the socket configured to detect a movement of the third magnet.

17. A process, comprising:

inserting a blade of a mechanical key into a keyway of a mechanical lock, rotating the mechanical key, wherein rotating the mechanical key changes a lock-state of the mechanical lock;

activating a switch, configured to temporarily electrically connect an RFID tag reader to an electrical power supply;

reading, using the RFID tag reader, information from a RFID tag;

storing as a history log, using a microprocessor, powered by the electrical power supply, the information read from the RFID tag and the lock-state of the mechanical lock in a non-transitory computer memory; and detecting a movement of a magnet disposed on an associated key, via the switch comprising a Hall sensor disposed on an inside wall of a keyway.

18. The process of claim 17, further comprising transmitting when interrogated, using a data-port connected to the microprocessor, the history log to an interrogation device.

* * * * *